US010902388B2

(12) United States Patent
Trieflinger

(10) Patent No.: US 10,902,388 B2
(45) Date of Patent: Jan. 26, 2021

(54) METHOD AND DEVICE FOR ADDING TRANSACTIONS TO A BLOCKCHAIN

(71) Applicant: Robert Bosch GmbH, Stuttgart (DE)

(72) Inventor: Sven Trieflinger, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 328 days.

(21) Appl. No.: 15/987,640

(22) Filed: May 23, 2018

(65) Prior Publication Data
US 2018/0349867 A1 Dec. 6, 2018

(30) Foreign Application Priority Data

May 30, 2017 (DE) .................. 10 2017 209 014

(51) Int. Cl.
*G06Q 20/36* (2012.01)
*G06Q 20/06* (2012.01)
(Continued)

(52) U.S. Cl.
CPC ....... *G06Q 20/065* (2013.01); *G06Q 20/3827* (2013.01); *G06Q 20/3829* (2013.01);
(Continued)

(58) Field of Classification Search
CPC ........... G06Q 20/065; G06Q 20/3827; G06Q 20/3829; G06Q 2220/00; H04L 9/085; H04L 9/3239; H04L 9/3247; H04L 9/0643; H04L 2209/38; H04L 2209/56; H04L 2209/46
(Continued)

(56) References Cited

U.S. PATENT DOCUMENTS 6,931,126 B1 * 8/2005 Jakobsson ............. H04L 9/3013
380/28
9,774,578 B1 * 9/2017 Ateniese .................. H04L 9/085
(Continued)

FOREIGN PATENT DOCUMENTS

DE 102016104478 A1 * 9/2016 ........... G06Q 20/401
DE 102016104478 A1 9/2016

OTHER PUBLICATIONS

"Scalable and Unconditionally Secure Multiparty Computation", Ivan Damgård, Advances in Cryptology, CRYPTO 2007, <https://doi.org/10.1007/978-3-540-74143-5_32> (Year: 2007).*
(Continued)

*Primary Examiner* — Neha Patel
*Assistant Examiner* — Duan Zhang
(74) *Attorney, Agent, or Firm* — Norton Rose Fulbright US LLP; Gerard Messina

(57) ABSTRACT

A method for adding transactions to a blockchain, characterized by the following features: subscribers of the computer network, who are connected by a predefined relation, are determined; multiplication triples are generated as a secret shared among the subscribers; at least one multiplication triple among the multiplication triples is mapped, along with the transactions, to a hash value; if the hash value falls below a predefined target value, a block, which contains the multiplication triple mapped to the hash value, as well as the transactions, is transferred to the blockchain; and a multiparty computation in the computer network is controlled with the remaining multiplication triples.

13 Claims, 1 Drawing Sheet

(51) Int. Cl.
    *G06Q 20/38*    (2012.01)
    *H04L 9/06*     (2006.01)
    *H04L 9/08*     (2006.01)
    *H04L 9/32*     (2006.01)

(52) U.S. Cl.
    CPC ............ *H04L 9/0643* (2013.01); *H04L 9/085* (2013.01); *H04L 9/3239* (2013.01); *H04L 9/3247* (2013.01); *G06Q 2220/00* (2013.01); *H04L 2209/38* (2013.01); *H04L 2209/46* (2013.01); *H04L 2209/56* (2013.01)

(58) Field of Classification Search
    USPC ........................................................ 705/67
    See application file for complete search history.

(56)            References Cited

U.S. PATENT DOCUMENTS

| | | | |
|---|---|---|---|
| 2005/0201561 A1* | 9/2005 | Komano | H04L 9/3255 380/255 |
| 2012/0002811 A1* | 1/2012 | Smart | H04L 9/085 380/255 |
| 2017/0300627 A1* | 10/2017 | Giordano | G16H 10/60 |
| 2017/0316391 A1* | 11/2017 | Peikert | H04L 9/006 |
| 2018/0328612 A1* | 11/2018 | Sinha | F24F 11/62 |

OTHER PUBLICATIONS

Beaver, Donald: "Efficient Multiparty Protocols Using Circuit Randomization", in Advances in Cryptology—CRYPTO'91, Ed. J. Feigenbaum, Springer-Verlag Berlin Heidelberg (1992), pp. 420-432.

* cited by examiner

US 10,902,388 B2

METHOD AND DEVICE FOR ADDING TRANSACTIONS TO A BLOCKCHAIN

RELATED APPLICATION INFORMATION

The present application claims priority to and the benefit of German patent application no. 10 2017 209 014.6, which was filed in Germany on May 30, 2017, the disclosure which is incorporated herein by reference.

FIELD OF THE INVENTION

The present invention relates to a method for adding transactions to a blockchain. The present invention further relates to a corresponding device, a corresponding computer program, as well as a corresponding storage medium.

BACKGROUND INFORMATION

In cryptology, a database, whose integrity is secured by storing, in each instance, a hash value of the previous data record in the subsequent data record, is understood as a blockchain or block chain. This cryptographic linking forms the basis of so-called cryptocurrencies, but may also contribute to increasing the transaction security in other distributed systems.

Patent document DE 10 2016 104 478 A1 is directed to methods, systems and computer program products for securing data operations in a computer-based system, which includes interconnected nodes; the nodes being configured in such a manner, that they may transmit, receive and store data; and the method including the execution of computer-based cryptographic methods, in order to produce two or more proofs of work (PoW); the execution including: using crawler search runs, demonstrably ascertaining, from each node of at least a subset of the interconnected nodes, a corresponding subset of data, which are stored on nodes of the system; and at each node of the subset, demonstrably acquiring data in the subset of data.

SUMMARY OF THE INVENTION

The present invention provides a method for adding transactions to a blockchain, a corresponding device, a corresponding computer program, as well as a storage medium, according to the independent claims.

The proposed approach is based on the knowledge that a conventional PoW requires considerable energy consumption. In this context, the computations performed within the scope of the PoW are used, as a rule, for no reason other than to establish a consensus between the nodes connected in the blockchain. Therefore, one aspect of the present invention is to modify the PoW algorithm, in order to produce a useful side effect without increasing the energy consumption.

One specific advantage of the modified method is that, in order to produce the proof of work, so-called multiplication triples (Beaver triples, Beaver's triples) are generated, which may be used subsequently for performing secure multiparty computations (SMPC's). Relevant protocols are introduced in BEAVER, Donald, Efficient multiparty protocols using circuit randomization, In: Annual International Cryptology Conference, Springer, Berlin, Heidelberg, 1991, pp. 420-432.

Advantageous further refinements of and improvements to the root idea set forth in the independent claim are rendered possible by the measures specified in the dependent claims. Thus, the transactions combined in a data block of the blockchain may include the entries of nodes into the computer network or exits of nodes from the computer network. Therefore, the (theoretical) availability of nodes may be deduced immediately from the blockchain by every node.

Exemplary embodiments of the present invention are represented in the drawing and explained in greater detail in the following description.

DETAILED DESCRIPTION

Figure 1:
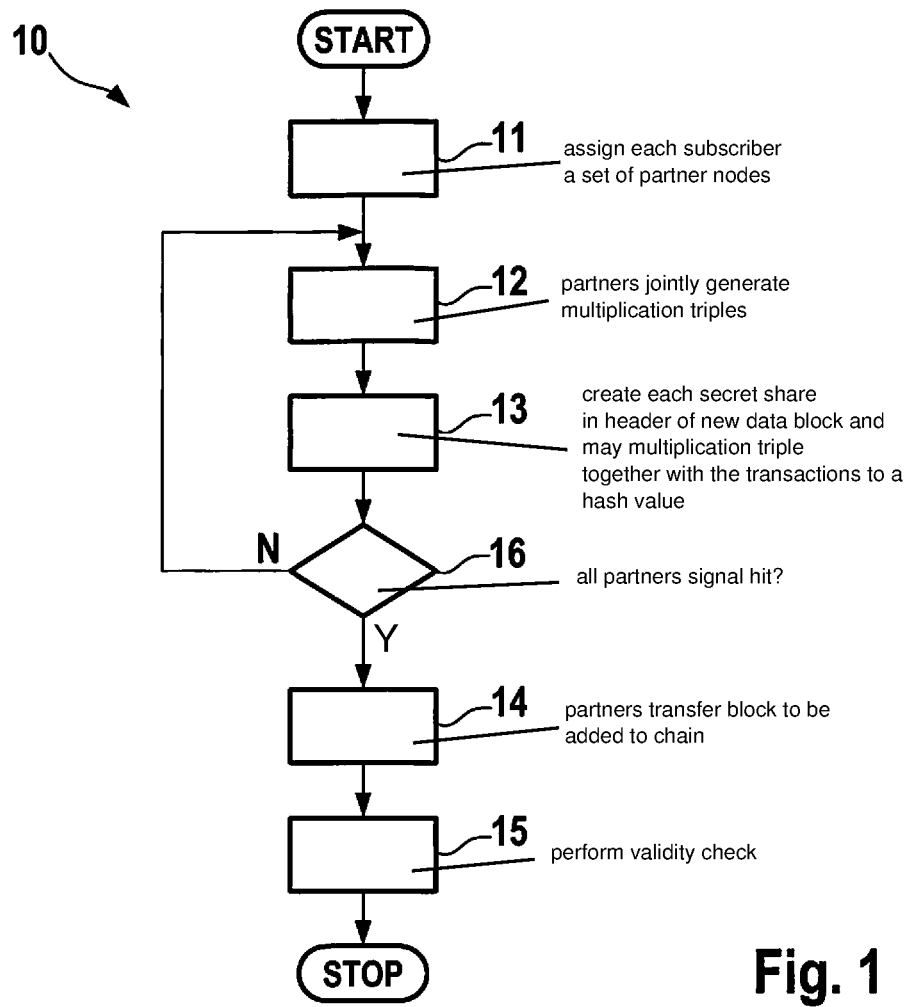
FIG. 1 shows the flow chart of a method according to a first specific embodiment.

FIG. 1 illustrates a functional aspect of the proposed method 10, in light of the Bitcoin cyptocurrency: each subscriber of a network is assigned a set of partners, which are described by a relationship or relation P (operation 11). In the further course of method 10, these partners generate multiplication triples jointly. P is symmetric (that is, if a subscriber n is a partner of subscriber m, then m is also a partner of n) and irreflexive (that is, a subscriber is never a partner of himself/herself). P shall be defined uniformly over the subscribers. One implementation provides for P to be derivable deterministically from the state of the blockchain. This may be achieved by a special "membership transaction," which is used in order to register or cancel the registration of subscribers, when they enter or exit the computer network. Since the order of the transactions is fixed and ultimately uniform among the nodes, this also applies to resulting relation P.

As soon as a block is intended to be transferred to the blockchain, the partners begin to generate (operation 12) multiplication triples $t_i=(a, b, c)$ jointly, using a protocol suitable for this. This results in each partner being provided with a secret share ([a], [b], [c]), such that multiplication triple $t_i$ is distributed among all of the partners as a secret.

On each partner node, each secret share ([a], [b], [c]) generated is now created in the header data (header) of a new data block as a nonce, before the multiplication triple is mapped, together with the transactions to be linked, to a hash value, the so-called hash cash (operation 13). In this context, the encoding of $t_i$ is intended to allow the individual secret shares ([a], [b], [c]) to be extracted for future verification (see below). From this standpoint, an example of suitable encoding is the simple linking of the bytes of the secret shares ([a], [b], [c]), which is filled up to the maximum size of the elements of the finite field that is used in the SMPC protocol selected. If the resulting hash is less than the current target value (decision 16, branch Y), the subscriber in question signals to the partners, that his/her secret share of multiplication triple $t_i$ is a hit.

In this respect, if all of the partners signal a hit before the computer network agrees to a new data block, the partners enter an operation 14 to transfer the block to be added to the chain. To this end, each partner initially signs his/her secret share, using his/her private key. Each partner then transmits his/her signed secret share to a deterministically selected node among the partners, the so-called coordinator. The selection may fall, for example, to the first subscriber, in accordance with the lexically sorted list of the public keys of the partners. After the coordinator receives the signed secret shares of all the partners, it assembles a header, which contains an encoding of the signed secret shares as a nonce, and distributes the resulting block over the computer network. Similarly to the encoding in operation 13, in this case, the encoding should allow the individual secret shares to be extracted for future verification (see below). To this end, simple linkage of the byte representation of the signed secret shares is considered in this case, as well.

Subscribers, who receive the block, perform a validity check (operation 15) of the hash cash, as in the case of the conventional Bitcoin algorithm. In addition, they check if components a, b and c form a valid multiplication triple, that is, satisfy the equation c=a·b. The receivers may do that easily, since all of the secret shares ([a], [b], [c]) may be extracted from the header data. Finally, they verify that the secret shares are signed by subscribers, who satisfy predefined relation P. This is also easy to check, since relation P may be derived from the state of the blockchain.

Since the multiplication triple, which is contained in successfully generated blocks and is used as a proof of work, is now public, it is worthless for secret sharing within the scope of a multiparty computation. However, all of the secret shares, which were generated jointly by the partners or other subscribers prior to obtaining the hit, remain secret and may therefore be used by the partners in the so-called online phase of an SMPC.

Figure 2:
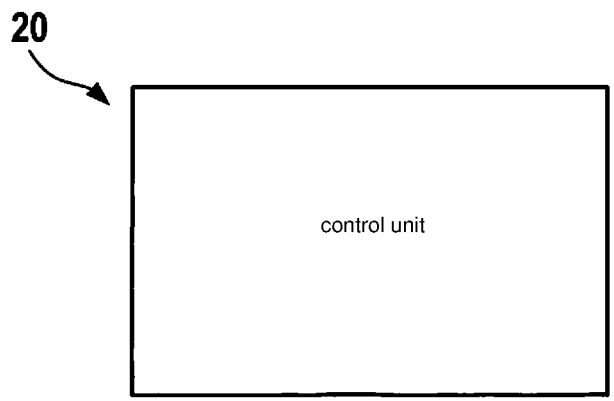
FIG. 2 shows a control unit according to a second specific embodiment.

This method 10 may be implemented, for example, as software or hardware, or in a combined form of software and hardware, in, for example, a control unit 20, as the schematic representation of FIG. 2 clearly shows.

What is claimed is:

1. A method for adding transactions to a blockchain in a computer network, the method comprising:
   determining subscribers of the computer network, who are connected by a predefined relation;
   generating multiplication triples as a secret shared among the subscribers, each of the multiplication triples being jointly generated by the subscribers and each of subscribers being provided a respective secret share of each of the multiplication triples;
   mapping at least one multiplication triple among the multiplication triples is mapped, along with the transactions, to a hash value;
   transferring, when the hash value falls below a predefined target value, a block, which contains the multiplication triple mapped to the hash value, as well as the transactions, to the blockchain, wherein the transferring of the block includes:
      each of the subscribers signing, using a respective private key of the subscriber, its respective secret share of the multiplication triple mapped to the hash value, and
      transmitting, by each of the subscribers, the signed respective secret shares of the multiplication triple, to a coordinator selected from among the subscribers, wherein the coordinator encodes the signed respective secret shares of the multiplication triple in a nonce, and wherein the coordinator transmits the block to a plurality of receivers within the computer network, wherein header data of the block contains the nonce, and payload data of the block includes the transactions; and
   controlling a multiparty computation in the computer network with the remaining multiplication triples.

2. The method of claim 1, wherein the receivers map the multiplication triple contained in the block, along with the transactions, to the hash value, and wherein the receivers check that the hash value falls below the target value, that the multiplication triple is valid, and that the secret shares are signed by signatories, who are connected by the predefined relation.

3. The method of claim 1, wherein the coordinator is selected, using a linear order relation on a number of public keys of the subscribers.

4. The method of claim 1, wherein the relation is derived from the blockchain.

5. The method of claim 1, wherein the transactions include transactions indicating nodes entering into the computer network or exits of nodes from the computer network.

6. The method of claim 1, wherein the transactions are business transactions, and wherein the blockchain is a register of ownership of a cryptocurrency.

7. A non-transitory computer readable medium having a computer program, which is executable by a processor, comprising:
   a program code arrangement having program code for adding transactions to a blockchain in a computer network, the program code, when executed by the processor, causing the processor to perform the following:
      determining subscribers of the computer network, who are connected by a predefined relation;
      generating multiplication triples as a secret shared among the subscribers, each of the multiplication triples being jointly generated by the subscribers and each of subscribers being provided a respective secret share of each of the multiplication triples;
      mapping at least one multiplication triple among the multiplication triples is mapped, along with the transactions, to a hash value;
      transferring, if the hash value falls below a predefined target value, a block, which contains the multiplication triple mapped to the hash value, as well as the transactions, to the blockchain, wherein the transferring of the block includes:
         each of the subscribers signing, using a respective private key of the subscriber, its respective secret share of the multiplication triple mapped to the hash value, and
         transmitting, by each of the subscribers, the signed respective secret shares of the multiplication triple, to a coordinator selected from among the subscribers, wherein the coordinator encodes the signed respective secret shares of the multiplication triple in a nonce, and wherein the coordinator transmits the block to a plurality of receivers within the computer network, wherein header data of the block contains the nonce, and payload data of the block includes the transactions; and
      controlling a multiparty computation in the computer network with the remaining multiplication triples.

8. A device for adding transactions to a blockchain in a computer network, comprising:
   a control unit including hardware, the control unit configured to:
      determine subscribers of the computer network, who are connected by a predefined relation;
      generate multiplication triples as a secret shared among the subscribers, each of the multiplication triples being jointly generated by the subscribers and each of subscribers being provided a respective secret share of each of the multiplication triples;
      map at least one multiplication triple among the multiplication triples is mapped, along with the transactions, to a hash value;

transfer, if the hash value falls below a predefined target value, a block, which contains the multiplication triple mapped to the hash value, as well as the transactions, to the blockchain, wherein the transferring of the block includes:
  each of the subscribers signing, using a respective private key of the subscriber, its respective secret share of the multiplication triple mapped to the hash value, and
  transmitting, by each of the subscribers, the signed respective secret shares of the multiplication triple, to a coordinator selected from among the subscribers, wherein the coordinator encodes the signed respective secret shares of the multiplication triple in a nonce, and wherein the coordinator transmits the block to a plurality of receivers within the computer network, wherein header data of the transmitted block contains the nonce, and payload data of the transmitted block includes the transactions; and
  control a multiparty computation in the computer network with the remaining multiplication triples.

9. The non-transitory computer readable medium of claim 7, wherein the transactions include transactions indicating nodes entering into the computer network or exits of nodes from the computer network.

10. The device of claim 8, wherein the transactions include transactions indicating nodes entering into the computer network or exits of nodes from the computer network.

11. The method of claim 1, wherein the transactions include membership transactions, the membership transactions including registrations of subscribers when they enter the computer network or registration cancelations of subscribers when they exit the computer network.

12. The non-transitory computer readable medium of claim 7, wherein the transactions include membership transactions, the membership transactions including registrations of subscribers when they enter the computer network or registration cancelations of subscribers when they exit the computer network.

13. The device of claim 8, wherein the transactions include membership transactions, the membership transactions including registrations of subscribers when they enter the computer network or registration cancelations of subscribers when they exit the computer network.

* * * * *